United States Patent
Lee

(10) Patent No.: US 9,104,244 B2
(45) Date of Patent: Aug. 11, 2015

(54) ALL-IN-ONE CHINESE CHARACTER INPUT METHOD

(75) Inventor: Clement Lee, Hong Kong (CN)

(73) Assignee: Yahoo! Inc., Sunnyvale, CA (US)

( * ) Notice: Subject to any disclaimer, the term of this patent is extended or adjusted under 35 U.S.C. 154(b) by 1063 days.

(21) Appl. No.: 12/479,668

(22) Filed: Jun. 5, 2009

(65) Prior Publication Data

US 2010/0309137 A1 Dec. 9, 2010

(51) Int. Cl.
*G06F 3/02* (2006.01)
*G06F 3/01* (2006.01)

(52) U.S. Cl.
CPC ..................................... *G06F 3/018* (2013.01)

(58) Field of Classification Search
USPC ................. 345/171, 156, 168, 169, 173–178; 178/18.01–18.09, 18.11; 715/700, 713
See application file for complete search history.

(56) References Cited

U.S. PATENT DOCUMENTS

| | | | |
|---|---|---|---|
| 6,562,078 B1 | 5/2003 | Yang et al. | |
| 6,801,659 B1 | 10/2004 | O'Dell | |
| 6,822,585 B1 * | 11/2004 | Ni et al. | 341/28 |
| 2005/0027534 A1 * | 2/2005 | Meurs et al. | 704/270 |
| 2005/0057512 A1 * | 3/2005 | Du et al. | 345/168 |
| 2006/0229864 A1 * | 10/2006 | Suontausta et al. | 704/8 |
| 2006/0242576 A1 * | 10/2006 | Nagel et al. | 715/535 |
| 2007/0152980 A1 * | 7/2007 | Kocienda et al. | 345/173 |
| 2008/0235003 A1 * | 9/2008 | Lai et al. | 704/8 |
| 2008/0270118 A1 * | 10/2008 | Kuo et al. | 704/9 |
| 2009/0235165 A1 * | 9/2009 | Fux et al. | 715/263 |
| 2009/0287671 A1 * | 11/2009 | Bennett | 707/4 |

FOREIGN PATENT DOCUMENTS

| | | | |
|---|---|---|---|
| CN | 101055498 A | 10/2007 | C06F 3/023 |
| EP | 2 120 130 A1 | 11/2009 | |

OTHER PUBLICATIONS

Chinese Office Action, Jul. 21, 2014, Pub. 2014071601138730.

* cited by examiner

*Primary Examiner* — Charles V Hicks
*Assistant Examiner* — Jeffrey Steinberg
(74) *Attorney, Agent, or Firm* — Martine Penilla Group, LLP

(57) ABSTRACT

Embodiments of the present invention describe systems and methods for using a combined (or All-In-One) Chinese input method to enter Chinese characters in documents and forms on computers or on web sites. The combined Chinese input method includes a number of Chinese input methods that are frequently used by users. Chinese characters that match the strings of symbols typed by users are displayed under each of the Chinese input methods for users to select the correct characters under the desired Chinese input methods. The combined Chinese input method allows users to enter (or input) Chinese characters without specifying the Chinese input methods being used, which reduces the time used in switching input methods. Further, the combined Chinese input method can also be personalized to include Chinese input methods frequently used by or specified by users. The display of the Chinese characters matching the strings of symbols entered to form Chinese characters can also be personalized to enhance usability and to increase the speed of identifying matched Chinese characters.

17 Claims, 13 Drawing Sheets

ALL-IN-ONE CHINESE CHARACTER INPUT METHOD

BACKGROUND OF THE INVENTION

Millions of Internet users access web sites to view web content in different languages everyday. Most computers in the world allow users to type in Latin alphabets, which are also used for English. However, there are many languages that are not based on Latin alphabets (or Roman alphabets) and a lot of web content is based on these other languages. When users want to use computers or other types of computing devices, such as personal digital assistants (PDAs) and cell phones, to enter characters, the computing devices need to have a program to allow such entering and to recognize the characters.

An "input method" is an operating system component or program that allows users to enter characters and symbols not found on their input device. For instance, input method allows users to input Chinese, Japanese, Korean, and Indic characters using computer keyboards. It is commonly called input method editor (IME) in Microsoft Windows operating systems. Other operating systems may have their own names for the so called "input method."

For a language that has multiple input methods, a user can select an input method and use the selected method to enter characters. If the user wants to use another input method to enter (or input) characters, the user will need to take actions, such as locate the other method and make a selection of the other method, to switch to the other input method.

It is in this context that embodiments of the present invention arise.

SUMMARY OF THE INVENTION

Embodiments of the present invention describe systems and methods for using a combined (or All-In-One) Chinese input method to enter Chinese characters in documents and forms on computers or on web sites. The combined Chinese input method includes a number of Chinese input methods that are frequently used by users. Chinese characters that match the strings of symbols typed by users are automatically generated and displayed under each of the Chinese input methods for users to select the correct characters under the desired Chinese input methods. The combined Chinese input method allows users to enter (or input) Chinese characters without specifying the Chinese input methods being used, which reduces the time used in switching input methods. Further, the combined Chinese input method can also be personalized to include Chinese input methods frequently used or specified by users. The display of the Chinese characters matching the strings of symbols entered to form Chinese characters can also be personalized to enhance usability and to increase the speed of identifying matched Chinese characters.

It should be appreciated that the present invention can be implemented in numerous ways, including as a method, a system, or a device. Several inventive embodiments of the present invention are described below.

In one embodiment, an electronic device implementing a method for Chinese input, is provided. The method includes receiving a request to use a combined Chinese input method from a user. The method also includes receiving a first string of symbols typed in sequentially by the user. The first string of symbols is used to input a first Chinese character. The method further includes displaying Chinese characters that match the first string of symbols for a plurality of Chinese input methods included in the combined Chinese input method. The displaying provides a graphical illustration of options for the first Chinese character, each option being from a different input method of the combined Chinese input method. In addition, the method includes receiving a signal indicating a selection of one of the displayed Chinese characters as the first Chinese character.

In another embodiment, an electronic device implementing a method for personalized Chinese input is provided. The method includes receiving a request to use a combined Chinese input method from a user, and identifying the user and Chinese input history of the user after receiving a request to use a combined Chinese input method from the user. The method also includes identifying a plurality of Chinese input methods that had been used by the user and an order of the plurality of Chinese input methods from a most frequently used method to a least frequently used method based on the Chinese input history of the user. The plurality of the Chinese input methods are part of the combined Chinese input method. In addition, the method includes receiving a first string of symbols entered by the user. The first string of symbols is used to input a first Chinese character. Additionally, the method includes identifying Chinese characters that match the first string of symbols entered by the user for each of the plurality of Chinese input methods, and sorting the identified Chinese characters in the order from most frequently or recently entered characters to least frequently or recently entered characters for each of the plurality of Chinese input methods. Further, the method includes displaying the Chinese characters that match the first string of symbols entered by the user for the plurality of Chinese input methods included. The sorted and matched Chinese characters are displayed under each of the plurality of Chinese input methods. The plurality of Chinese input methods are displayed from the most frequently used method to the least frequently used method. The method also includes receiving a signal indicating a selection of one of the displayed Chinese characters as the first Chinese character, and displaying the selected first Chinese character on a display screen.

In yet another embodiment, a system for entering Chinese characters without specifying Chinese input methods is provided. The system includes a combined Chinese input program. The combined Chinese input program is configured to identify Chinese characters that match a string of symbols entered by a user for a plurality of Chinese input methods. A user of the system does not need to specify a Chinese input method before entering the string of symbols. The system also includes a Chinese input display generator. The Chinese input display generator interacts with the combined Chinese input program to generate a display of the identified Chinese characters for the plurality of Chinese input methods.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1A:
FIG. 1A shows a Chinese (Taiwan) keyboard layout for entering traditional Chinese characters, in accordance with one embodiment of the present invention.

As mentioned above, millions of Internet users access web sites to view web content in different languages everyday. When people use computers or other types of computing devices, such as personal digital assistants (PDAs) and cell phones, to enter non-Latin words, the computing devices require a program to allow such entering and to recognize the characters. It was also described above that an "input method" is an operating system component or program that allows users to enter characters and symbols not found on their input device. An input method allows users to input non-Latin characters, such as Chinese, Japanese, Korean, and Indic characters, using standard computer keyboards and interfaces.

About one-fifth of the world's population, or over one billion people, speak some form of Chinese as their native language. A Chinese character, also known as a Han character, is a logogram used in writing Chinese (hanzi), Japanese (kanji), and sometimes Korean (hanja). The number of Chinese characters contained in the Chinese Kangxi dictionary is approximately 47,035, although a large number of these are rarely used variants accumulated throughout history. Studies carried out in China have shown that full literacy in the Chinese language requires only a knowledge between three and four thousand characters. In the Chinese writing system, the characters are morphosyllabic. Each character usually corresponds to a spoken syllable with a basic meaning. However, although Chinese words may be formed by characters with basic meanings, a majority of words in Mandarin Chinese require two or more characters to write (thus are polysyllabic). Often the words have meanings that are distinct from the characters they are made from. Cognate words in the various Chinese dialects, which have the same or similar meaning but different pronunciations, can be written with the same characters.

For the frequently used three to four thousand characters, most Chinese people know how each is pronounced and how each looks. However, for characters that are not frequently used, people might have trouble knowing how to pronounce and/or the precise strokes that form the characters. For the characters that do not belong in the group of the most frequently used (e.g. three to four thousand characters), pronunciation and the knowledge of the precise strokes of such characters would be even more challenging.

The Chinese language uses a logographic script, which is a script where one or more "characters" correspond roughly to one "word" or meaning. There are vastly more characters, or glyphs, than there are keys on a standard computer keyboard. A variety of keyboard input method editors (IME) have been designed to allow the input of Chinese characters using standard keyboards. Keyboard input methods for Chinese can be classified in three main types:
- by pronunciation,
- by structure of the characters,
- by encoding.

For each type of keyboard input methods for Chinese, there are a number of methods. For example, there are three exemplary keyboard input methods by relying on pronunciation as shown below.

Pronunciation:
- Pinyin (拼音) method is used in mainland China and also increasingly in Taiwan,
- Zhuyin method is used in Taiwan only, and
- Cantonese phonetic method (or Canton Pinyin, 廣東拼音) is mainly used in Hong Kong.

In addition, there are many keyboard input methods based on structure of the characters. Some examples are listed below.

Character Structure:
- Cangjie (倉頡) method,
- Simplified Cangjie (速成),
- CKC Chinese Input System,
- Boshiamy method,
- Dayi method,
- Array method,
- Four corner method,
- Q9 method,
- Shouwei method, Stroke count method,
Stroke method,
Wubi method,
Wubihua method,
Zheng code method,
Shou-wei Hao-ma method, and
Knot DNA method.

Further, there are a few keyboard input methods based on a combination of pronunciation and character structure (or encoding). Two examples are listed below.

Combination of Pronunciation and Character Structure:
Tze-loi method, and
Renzhi code method.

Many of those input methods have variations. For example, "Full Pinyin" and "Double Pinyin" are variations of the "Pinyin" input method. In addition, the input methods which require the user to select a character from a menu sometimes have sophisticated methods for guessing which characters the user intends to enter (or input) based on context.

A Chinese keyboard is simply a US layout (e.g. QWERTY keyboards) with Chinese input method labels printed on the keys. Without an input method handler, these keyboards can respond to Latin characters, provided that the US keyboard layout is selected in the operating system. Currently simplified Chinese characters are used in mainland China, while traditional Chinese characters are used in Taiwan and Hong Kong. Most modern input methods allow input of both simplified and traditional characters, but they simply default to one or the other based on locale setting. However, users do not need Chinese keyboards to enter Chinese characters. Thus, as long as an IME is available (or accessible) at a user's desktop, the user can enter Chinese characters by pressing on keys on a keyboard with Latin characters.

Computers in Taiwan often use Zhuyin (bopomofo) style keyboards (US keyboards with bopomofo labels), many also with Cangjie method key labels, as Cangjie is the standard method for speed-typing in Traditional Chinese. The bopomofo style keyboards are in lexicographical order, top-to-bottom left-to-right. The codes of three input methods are typically printed on the Chinese (traditional) keyboard: Zhuyin (upper right); Cangjie (lower left); and Dayi (lower right). FIG. 1A shows an embodiment of a Chinese (Taiwan) keyboard layout for entering traditional Chinese characters. In Hong Kong, both Chinese (Taiwan) and US keyboards are found. Other input methods such as Hanyu Pinyin (or simply Pinyin, 拼音) is identical to those of Simplified Chinese's, except the output characters are in Traditional Chinese. Keyboards used in the mainland of the People's Republic of China typically use an English US (United States) keyboard and input Chinese characters using Hanyu Pinyin (or simply Pinyin), which represents the sounds of Chinese characters using Latin letters.

Each Chinese input method mentioned above has its strengths and weaknesses and usage varies between people. For example, for someone who is already familiar with Pinyin, the Pinyin method can be learned instantly. However, the maximum typing rate is limited, and learning the system can be difficult for those not familiar with Pinyin (or Hanyu Pinyin). Wubi method takes much effort to learn, but expert typists can enter text much faster with it than with the phonetic methods, such as Pinyin method or Zhuyin method. Because of these factors, there is very little likelihood of a "standard" method evolving. Some people prefer using only one method, while others uses a number of methods to enter the Chinese characters. Many people can use a number of methods and are comfortable using one method to type certain characters, while using another method to type other characters. For example, a person that grew up in Hong Kong will likely be familiar with Cantonese phonetic method (or Canton Pinyin 廣東拼音, or simply Canton 廣東 method), since most people in Hong Kong speak Cantonese. In addition, many people in Hong Kong are becoming familiar with the Pinyin method. Further, many people in Hong Kong are trained to use Cangjie method and/or Simplified Cangjie method for their high input rate. Therefore, many people in Hong Kong would use a number methods that they know when typing characters.

As mentioned above, there are many unique Chinese characters. Users might know how certain characters look like and their meanings, but they might not know how to pronounce some of these characters. Under this condition, users can use an IME based on character structure. Alternatively, users might know how certain characters (or words) sound like, but they do not know precisely how they look like. They might only know key features of such characters (or roughly how they look like). Under this condition, users can use an IME based on pronunciation. This argument further explains that many Chinese users, not just in Hong Kong, know more than one input method for entering Chinese characters.

Figure 1B:
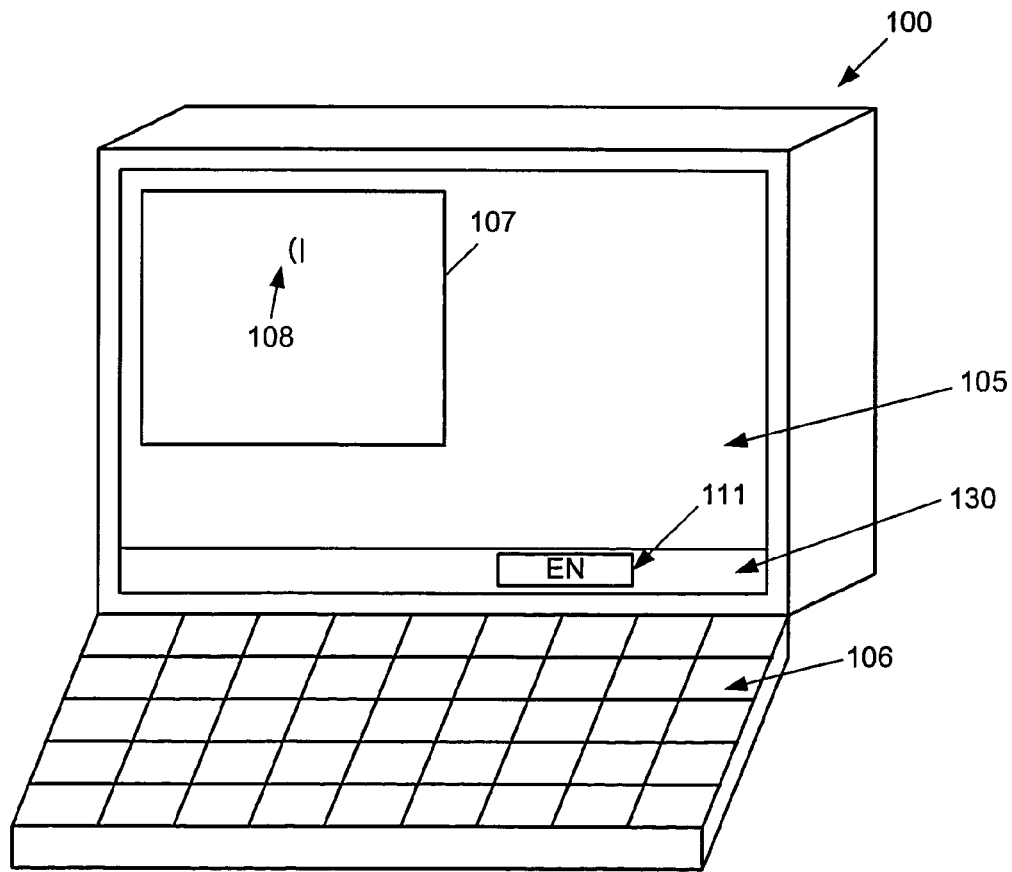
FIG. 1B shows a computing system installed with a Chinese input method editor (IME), in accordance with one embodiment of the present application.

Currently, when users want to enter Chinese characters, users will need to download a Chinese IME of a particular input method or a Chinese IME that includes a number of input methods. FIG. 1B shows computer screen 105 with a Chinese IME (software not visible) installed on the computer 100, in accordance with one embodiment of the present application. The computer 100 has a keyboard 106 with different keys. The default typing mode for the computer is English (EN). On computer screen 105, there is a Chinese input button 111 that shows the character-entering method. The Chinese input button 111 can be anywhere on the screen 105. Typically, button 111 is located either at the top or bottom of screen 105 on the tool bar, such as tool bar 130. If the character-entering method is English, button 111 shows "EN". The computer screen 105 has a WORD™ document 107 that describes China.

Figure 1C:
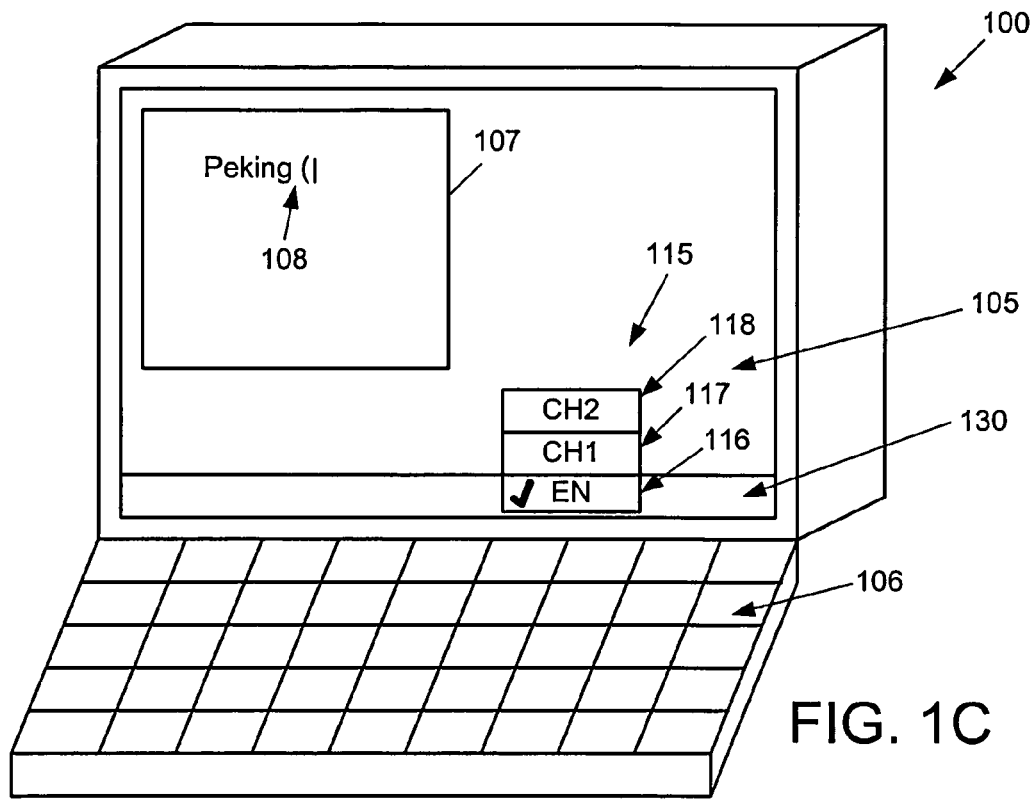
FIG. 1C shows a display on a document after an operation of the Chinese IME, in accordance with one embodiment of the present invention.
Figure 1D:
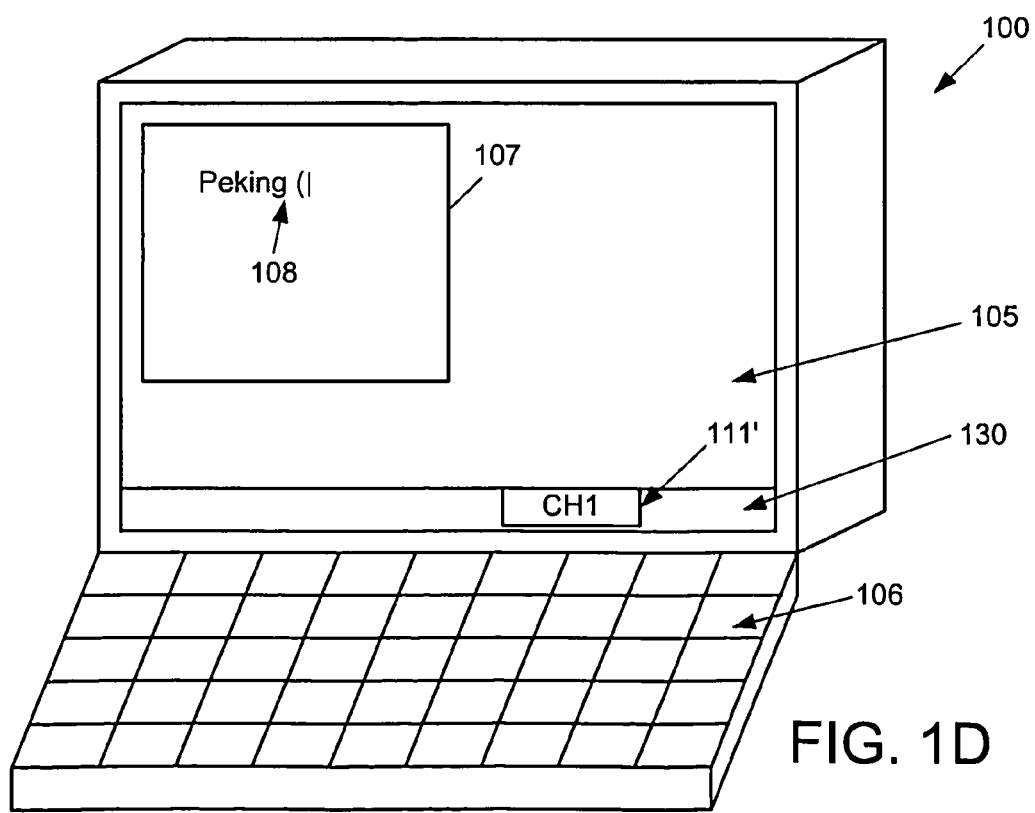
FIG. 1D shows a display on a document after an operation of the Chinese IME, in accordance with one embodiment of the present invention.

If the user wants to type two Chinese characters "北京" representing "Peking" in document 107 after the left bracket following "Peking" at a position noted by a position bar 108, the user would need to click on the Chinese input button 111 to switch input mode. After the user clicks on button 111, a selection field 115 appears, as shown in FIG. 1C, in accordance with one embodiment of the present invention. In selection field 115, there are three types of input methods. One of the methods is "English" input method (symbolized by "EN") 116, which is checked and is the current selected method for input (character input, or word input). The other two types are for Chinese input (or Chinese character input), which includes "Pinyin" method 117 (CH1) and "Cangjie" method 118 (CH2). The user can choose either one of them to enter Chinese characters. If use clicks on the Pinyin (拼音) method 117, users can enter Chinese characters by using Pinyin method and the selection field 115 shrinks to button 111' with "CH1" (or Pinyin method) being selected, as shown in FIG. 1D, in accordance with one embodiment of the current application.

Figure 1E:
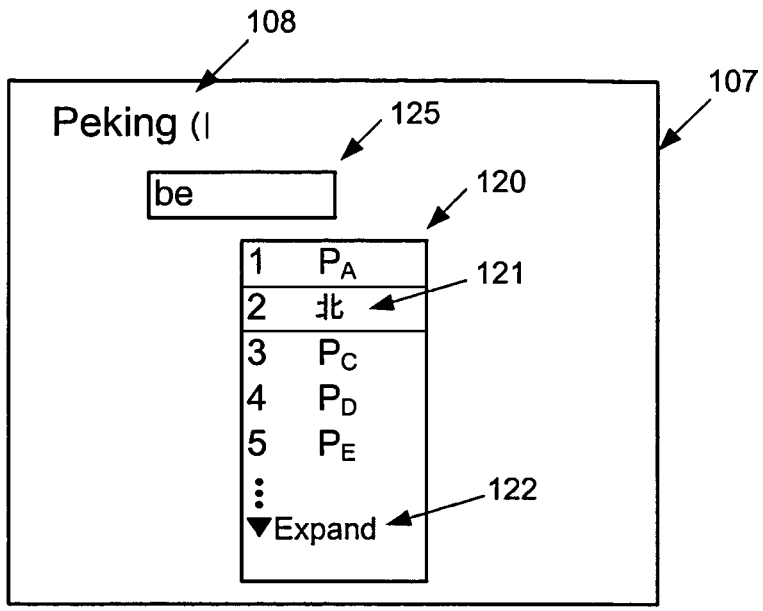
FIG. 1E shows a display on a document after an operation of the Chinese IME, in accordance with one embodiment of the present invention.

As mentioned above, the user wants to type in two Chinese characters "北京" (Peking). In one embodiment, the user can type in "bei3" (Pinyin with tone), or "bei" (Pinyin only) to create the character "北" and "Jing0" (Pinyin with tone) or "jing" (Pinyin only) to create the character "京". The alphanumeric string for Pinyin with tone of the first character "北" is "bei3." When user type in alphanumeric symbol(s) "b" or "be" of the alphanumeric string "bei3" in area 125, there will be a list of Chinese characters that have the Pinyin starting with "b" or "be" in area 120, as shown in the FIG. 1E. All Chinese characters that do not start with "b" or "be" are filtered out. If the user only types in one single alphabet "b", there will be a large number of Chinese characters that starts with "b" for Pinyin method. If the user types in the second alphabet "e" to make the combination of "be", the input method will further filter out the characters that starts with "b", but do not have the combination of "be".

In one embodiment, there a selection number in front of each character. For example, the character "北" has a selection number of 2 in front of it. The user can click on area 121 of "2北" to select the character "北" or continue typing in "i" behind "be." The user may also click in area 122 to expand the listing of matched Chinese characters. The displayed Chinese characters in area 120 do not have to be listed vertically only, in one column. The Chinese characters in area 120 can be in two dimensions with multiple rows and columns.

Figure 1F:
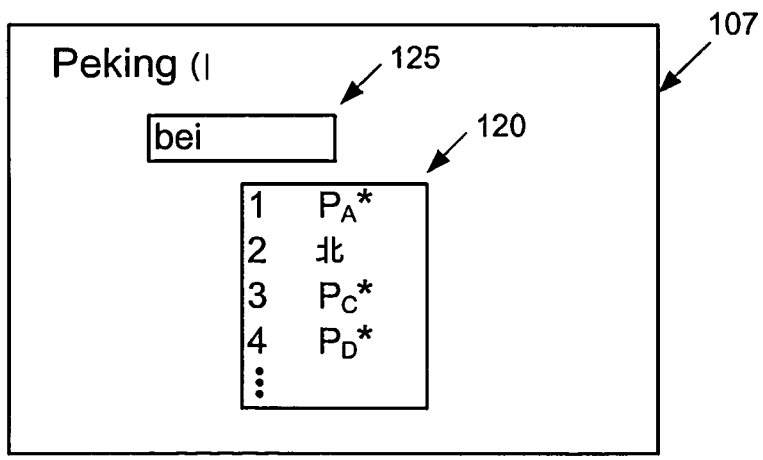
FIG. 1F shows a display on a document after an operation of the Chinese IME, in accordance with one embodiment of the present invention.
Figure 1G:
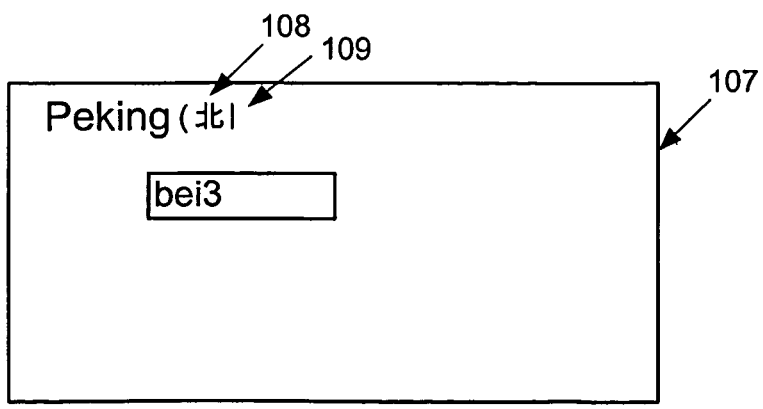
FIG. 1G shows a display on a document after an operation of the Chinese IME, in accordance with one embodiment of the present invention.

With the typed in "bei", a new filtered list of matching characters will appear, which include the character "北" with a selection number of 2 in front of it, as shown in FIG. 1F in accordance with one embodiment of the present invention. Again the user can click on the "2北" to select the character "北" or continue typing in "3" behind "bei". The "3" behind "bei" identifies the raised tone of the character "北". Once the full "bei3" is typed in, the character "北" will be automatically entered in the location of the position bar 108, as shown in FIG. 1G. A new position bar 109 moves to a new location following the character "北". The character "京" can be entered (or input) in a similar fashion using Pinyin method or using Cangjie method. If the user wants to switch to Cangjie method to enter character, the user needs to select "CH2" (or Cangjie method) by using button 111' (or 111).

Switching from one Chinese input method to another Chinese input method is time consuming. The example above only show two methods. As mentioned above, there are many Chinese input methods. A user can download multiple Chinese input methods onto his/her computer. When this occurs, there will be more than one button on the user's computer screen 105 for the user to choose for Chinese input. The user will need to select the desired methods for entering Chinese characters by clicking on the various Chinese input method buttons on the computer screen 105 to change the input method.

Figure 2A:
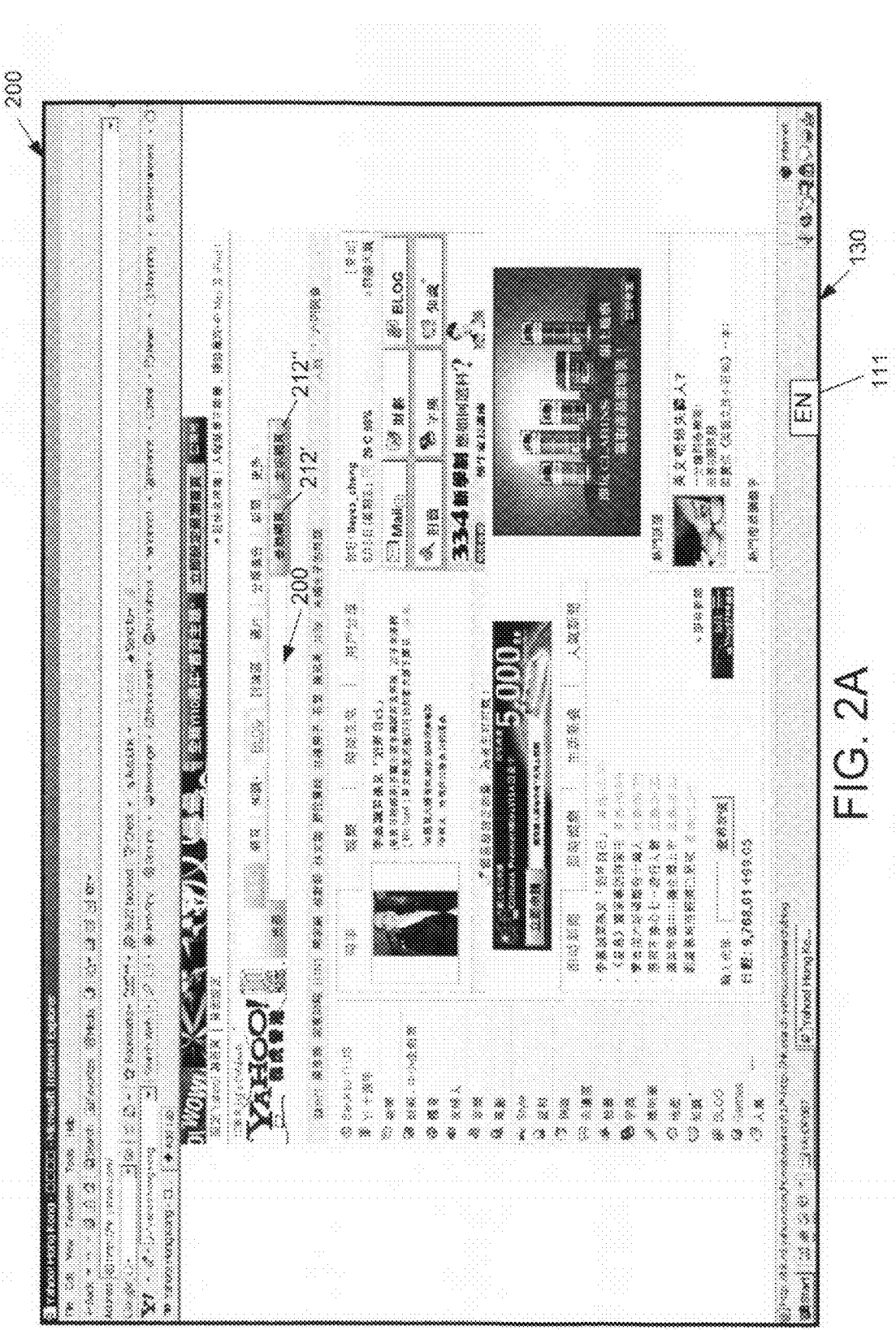
FIG. 2A shows an entry page of Yahoo!™ Hong Kong, in accordance with one embodiment of the present invention.

The Chinese input methods described above also apply when a user, User-A, is entering Chinese characters in a search box. FIG. 2A shows an entry page 200 of Yahoo!™ Hong Kong, in accordance with one embodiment of the present invention. User-A can enter English word, such as "swine flu," to search for content related to swine flu. If User-A wants to search content in Chinese that is related to "北京" (Peking), User-A would typically type in Chinese characters to conduct search. User-A will need to select one or two methods to enter the two Chinese characters "北京" (Peking), as described above in FIGS. 1B-1G. As explained earlier, in order to enter Chinese characters, User-A needs to switch character-entering methods by clicking on input method button 111 to choose method(s) that User-A wants to use to enter (or input) the Chinese characters.

Figure 2B:
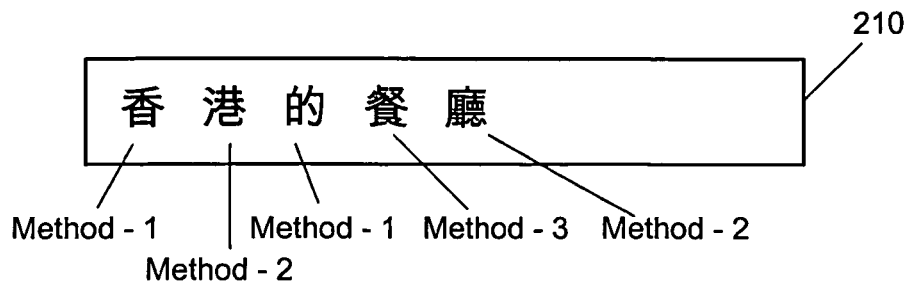
FIG. 2B shows a string of Chinese characters being entered by a variety of Chinese input methods, in accordance with one embodiment of the present invention.

As the number of Chinese characters User-A wants to enter into the search box 210 increases, it is more likely for User-A to use more than one method for entering Chinese characters. User-A might need to switch methods back and forth to type in particular Chinese characters. FIG. 2B shows 5 Chinese characters entered by User-A in search box 210. User-A enters "香港的餐廳" (restaurants in Hong Kong) using 3 Chinese character-entering methods. The first character is entered using Method-1, and the second character is entered by Method-2. User-A switches back to Method-1 to enter the third character, and then switches to Method-3 to enter the fourth character. For the last character, User-A switches to use Method-2. It becomes obvious from the example in FIG. 2B that the switching method is inconvenient to User-A.

It would be desirable for User-A to type freely using the any of the character-entering method without having to switch or select a method of choice for the particular Chinese character User-A is entering.

Figure 2C:
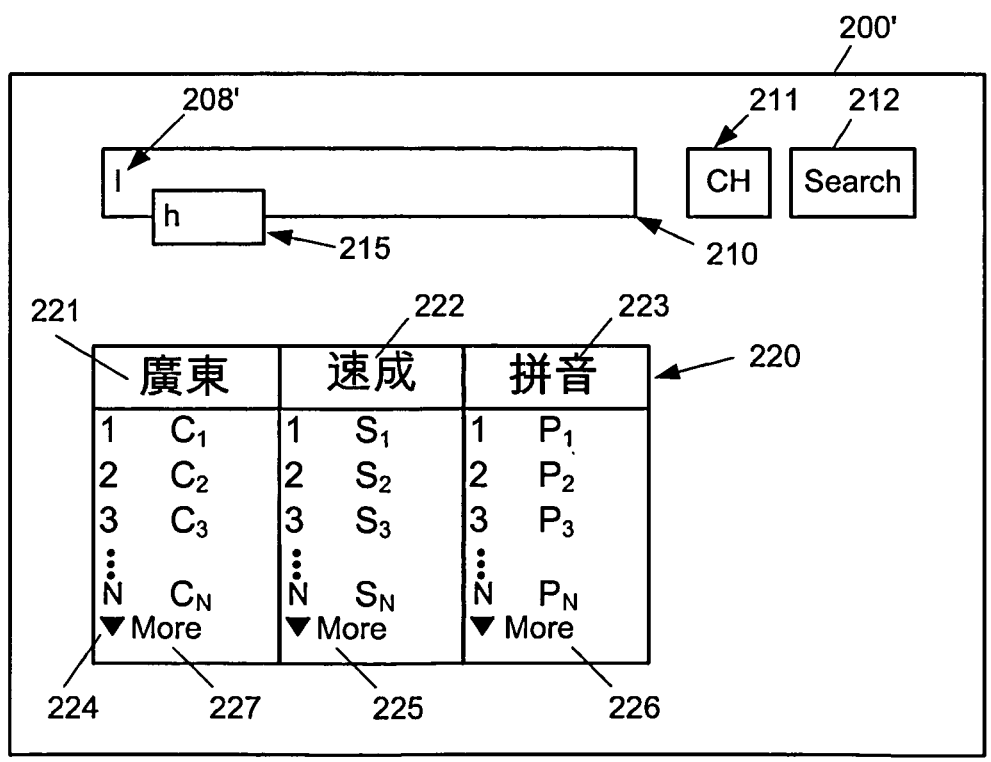
FIG. 2C shows a display on a search page after an operation of the combined Chinese input method, in accordance with one embodiment of the present invention.

FIG. 2C shows a combined (or All-In-One) Chinese input method that displays matched Chinese characters obtained automatically from multiple Chinese input methods, in accordance with one embodiment of the current application. FIG. 2C shows a search entry page 200' with a search box 210, which is identical to the search box 210 of FIG. 2A. Next to search box 210, there is a combined input method button 211, which is similar to the input method button 111 of FIG. 2A. The difference is that the input method button 111 of FIG. 2A is generated by a program operating with the user's tool bar 130, and input method button 211 is generated by the website that presents the search page 200'. Since User-A wants to enter Chinese characters, User-A clicks on the button 211 to select Chinese; therefore, "CH" (abbreviation for Chinese) is shown in button 211.

In the example of FIG. 2C, User-A wants to enter the character "香" (Hong in "Hong Kong") at position 208' in the search box 210. The character will appear at the position 208', which is identified by a vertical bar, which signals the position of the mouse. Below the search box 210, there is a entering box 215 for entering alphanumeric symbols needed to form the desired Chinese character. Below entering box 215, there is a field 220 that shows the Chinese characters that match the alphanumeric symbol(s) entered for a few Chinese input methods of the combined Chinese input method. In the example shown in FIG. 2C, there are 3 Chinese input methods in the combined Chinese input method, which include "Canton method" (廣東) in area 221, "Simplied Cangjie method" (速成) in area 222, and "Pinyin method" (拼音) in area 223. Below each method, there is a field, such as fields (or options) 224, 225, and 226, that shows Chinese characters matching the entered alphanumeric symbol(s) for the particular method.

FIG. 2C shows that when Use-A types in the first alphabet "h", each of fields 224, 225, and 226 show a number of Chinese Characters that match the alphabet "h" for the particular methods. The Chinese character-entering program filters out all the Chinese characters that do not start with "h" for the three methods shown. For example, field 224 shows Chinese characters, $C_1, C_2, \ldots, C_N$, that can be formed by having first alphabet being "h" for "Canton method." N is an integer and can be any number. Due to the limited spaced available for displaying, for example, N can be 10. Below $C_N$, there can be a "more" button 227 that User-A can push for more matched Chinese characters. For example, there could be 100 or more characters that have first alphabet "h" for the "Cantonese method." Similarly, there are a number of matched Chinese characters $S_1, S_2, \ldots, S_N$, for "Simplied Cangjie method" in field 225, and a number of matched Chinese characters, $P_1, P_2, \ldots, P_N$, for "Pinyin method" in field 226. The computing system or systems that render the search site (or web site) does not know which Chinese input method the user intends to use. The total number of matched characters for "Canton method" is I, which is an integer. The total number of matched characters for "Simplied Cangjie method" is J, and K for "Pinyin method."

Figure 2D:
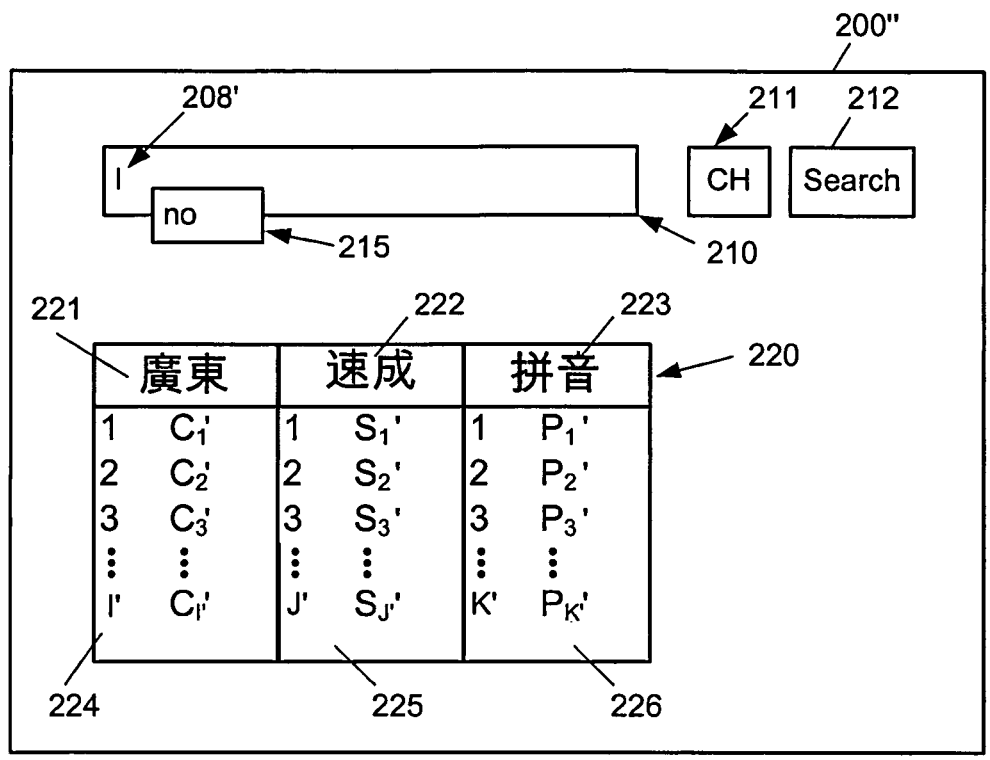
FIG. 2D shows a display on a search page after an operation of the combined Chinese input method, in accordance with one embodiment of the present invention.

To further narrow down the selection, User-A enters the second alphabet "o". The Chinese input software program filters out Chinese characters that are not formed by starting with alphabets "ho." FIG. 2D shows a number of Chinese characters that match the requirement of starting with "ho." The number of characters in fields 224, 225, and 226 of FIG. 2D should be less than the number of characters in fields 224, 225, and 226 of FIG. 2C, since the word pools are further filtered by the additional "o" after "h". In FIG. 2C, the number of matched Chinese characters in "Canton method" has been reduced to I', which is an integer and is equal to or less than I. Similarly, the number of matched Chinese characters in "Simplied Cangjie method" has been reduced to J', and to K' for "Pinyin method." Both J' and K' are integers. J' is equal to or less than J, and K' is equal to or less than K. With the entering of the additional "o" after "h", the lists of matched Chinese characters for the three methods are recreated. Words that are started with "h", but are not started with "ho" are filtered out.

Figure 2E:
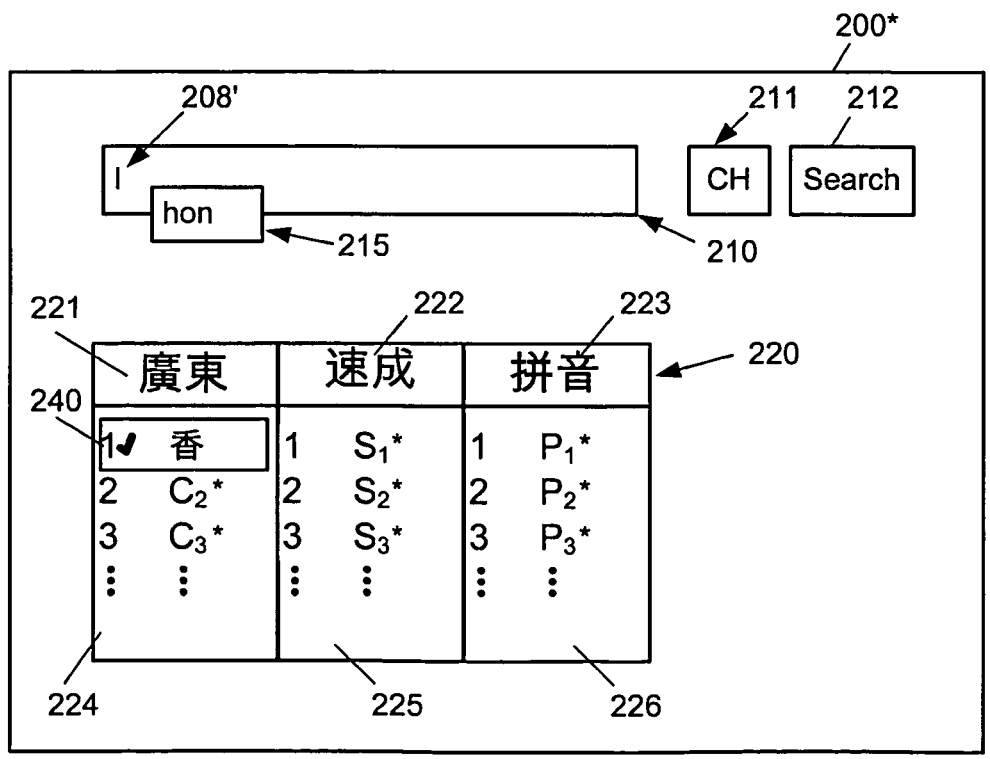
FIG. 2E shows a display on a search page after an operation of the combined Chinese input method, in accordance with one embodiment of the present invention.
Figure 2F:
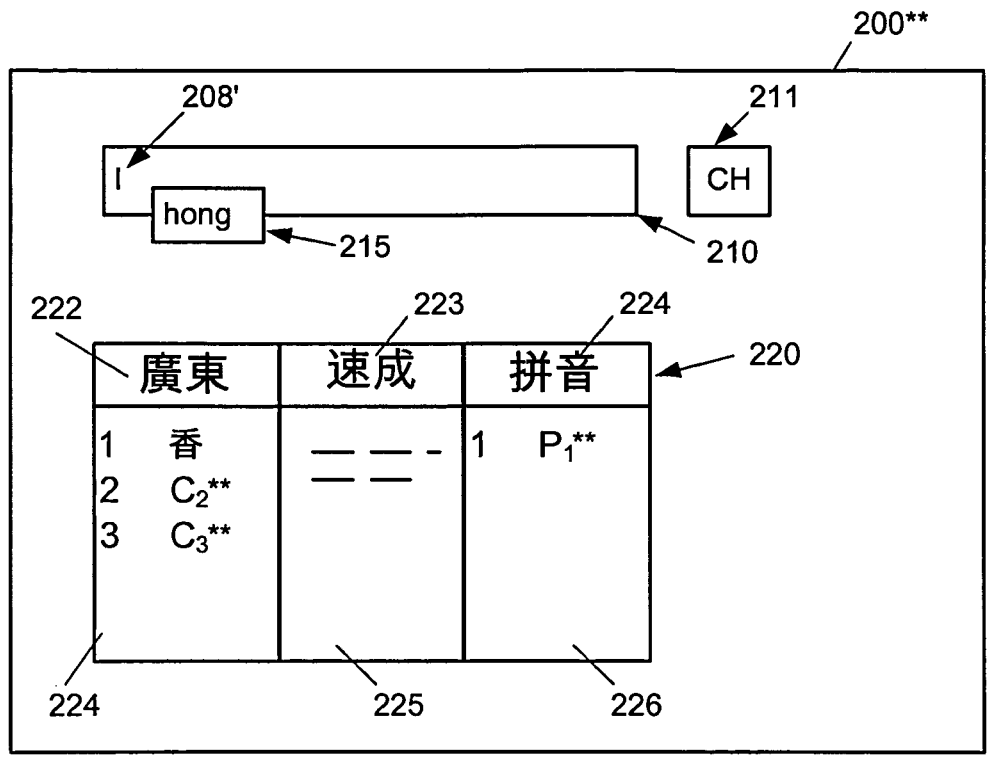
FIG. 2F shows a display on a search page after an operation of the combined Chinese input method, in accordance with one embodiment of the present invention.

FIG. 2E shows matched characters with additional filtering of "n" after "ho". After this additional filtering, Chinese character "Hong (香)" appears under number 1 of "Canton method." User-A can click on field 240 that include number "1" and the character "Hong (香)". With the selection, the Chinese character "Hong (香)" would be placed in the position 208'. Alternatively, User-A can use additional filtering to pick the targeted character. For example, if Use-A enters additional filtering "g" behind "hon," only three characters matches the "hong" with very few matched words per method will remain, which could make it easier for User-A to select. The example above shows that User-A knows the alphabets for Cantonese method for Chinese character "香" (Hong).

Figure 2G:
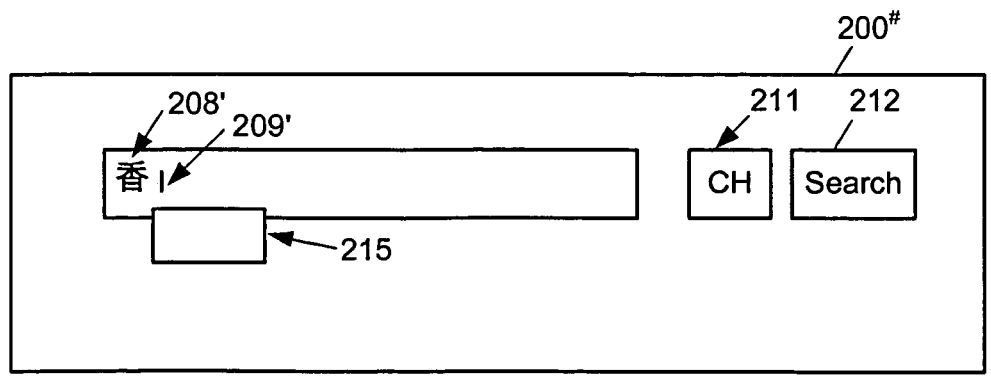
FIG. 2G shows a display on a search page after an operation of the combined Chinese input method, in accordance with one embodiment of the present invention.

After the Chinese character "香" is selected, the character is placed in the search box, as shown in FIG. 2G. The cursor moves to next position 109' and User-A can enter alphanumeric symbols to form the second Chinese character "Kong (港)."

In one embodiment, the program (or system with the program) can fill a character, such as "香", in position 108' after User-A only types in "h" or "ho", instead of displaying the complete word lists in field 220. This can occur if a character starting with symbols "h" or "ho", such as "香", has been entered recently by User-A or had been entered very frequently by User-A. The program can auto-select a possible candidate to fill in position 108'. If the auto-selected character is not the correct one, User-A can click on the auto-selected character in space 108' and the complete word lists similar to the ones in field 220 of FIG. 2C, or FIG. 2D will appear for User-A to choose. User-A can choose a matched character to enter additional symbol(s) to find the matched character. In this embodiment, the system (or the program) guesses the intent of User-A of selecting a Chinese character. Such an embodiment can be very useful for users using the Chinese input methods very frequently, as the usage history is tracked. Usage history can be tracked by cookies that are installed on users' computing devices, if users interact with websites. Alternatively, if users enters Chinese characters on documents or forms on personal computers, the usage history can be tracked (or stored) by users' personal computers.

User-A can use one of the three input methods described above to enter Chinese characters without manually switch from one method to another by clicking on an input method button. Again, the three methods shown in FIGS. 2C-2G are merely examples. The number of Chinese character-entering methods can be expanded to more, or can be less than 3. Additional fields that show additional methods can be displayed in field 220.

Figure 2H:
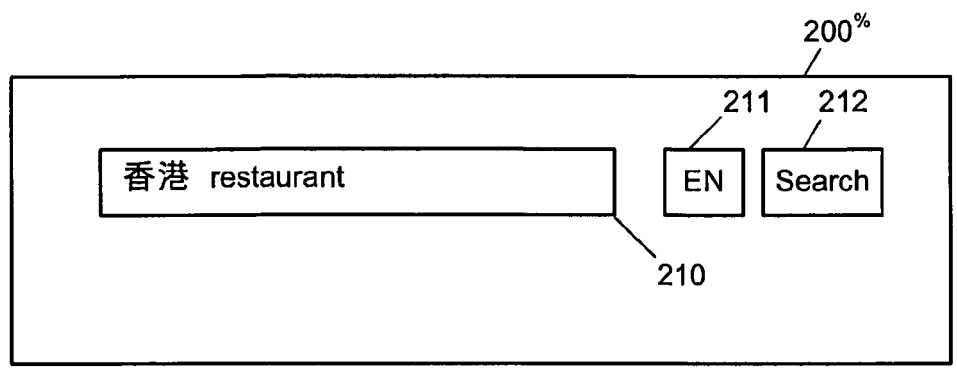
FIG. 2H shows a display on a search page after a user enters a string of Chinese characters and an English word, in accordance with one embodiment of the present invention.

The method described above allows User-A to enter a string of Chinese characters without worry about selecting an input method before entering each character. User-A can use the methods that he or she is comfortable or familiar to enter Chinese characters without making manual switch. User-A only needs to pick out the matched character under the particular method in User-A's mind when User-A types in alphanumeric symbols. User-A can also enter a string of words mixed with Chinese characters and English words. When User-A wants to English word(s), User-A only needs to click on button 211 to switch to English. FIG. 2H shows that User-A enters "Hong Kong (香港) restaurants" in search box 210. The Chinese characters were entered by the method described above and the word "restaurants" is entered by switching the method button 211 to English (or "EN"). After User-A enters all the characters and words in the search box 210, User-A can push the search button 212 to initiate a search.

The Chinese input method described above allows users to enter search key words in Chinese without having to specify particular Chinese input method first. It also allows users to switch from one method to another during character entering without pressing keys or buttons to specify the method in use. Results of matched Chinese characters for input methods that are commonly used or selected by users are displayed together for users to select characters. In the embodiment shown in FIGS. 2C-2J, the program resides on the search site, such as Yahoo! Hong Kong. The search site knows its client base and knows the most popular Chinese input methods for its users. Users that are signed in to their accounts can enjoy more customizations, or recent histories can be saved with the assistance of cookies. The search web site can create a program that combines the most popular Chinese character-entering method to allow users to enter Chinese characters without specifying methods.

Figure 2I:
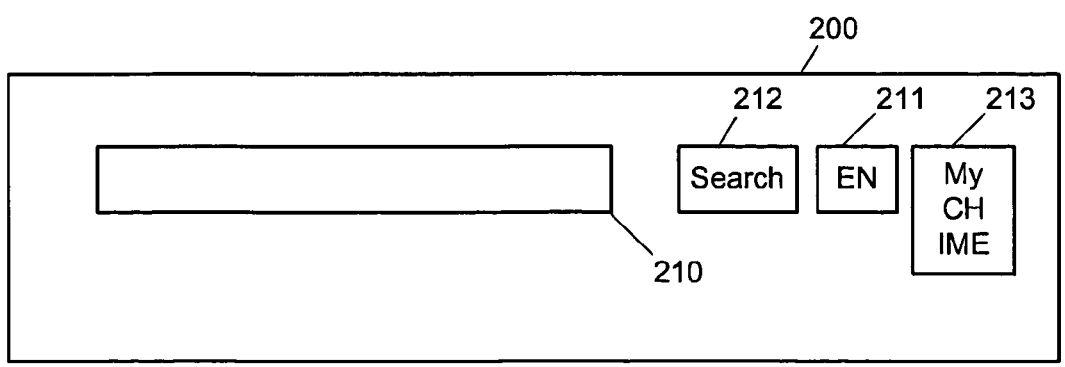
FIG. 2I shows a button available to personalize the combined Chinese input method by a user, in accordance with one embodiment of the present invention.
Figure 2J:
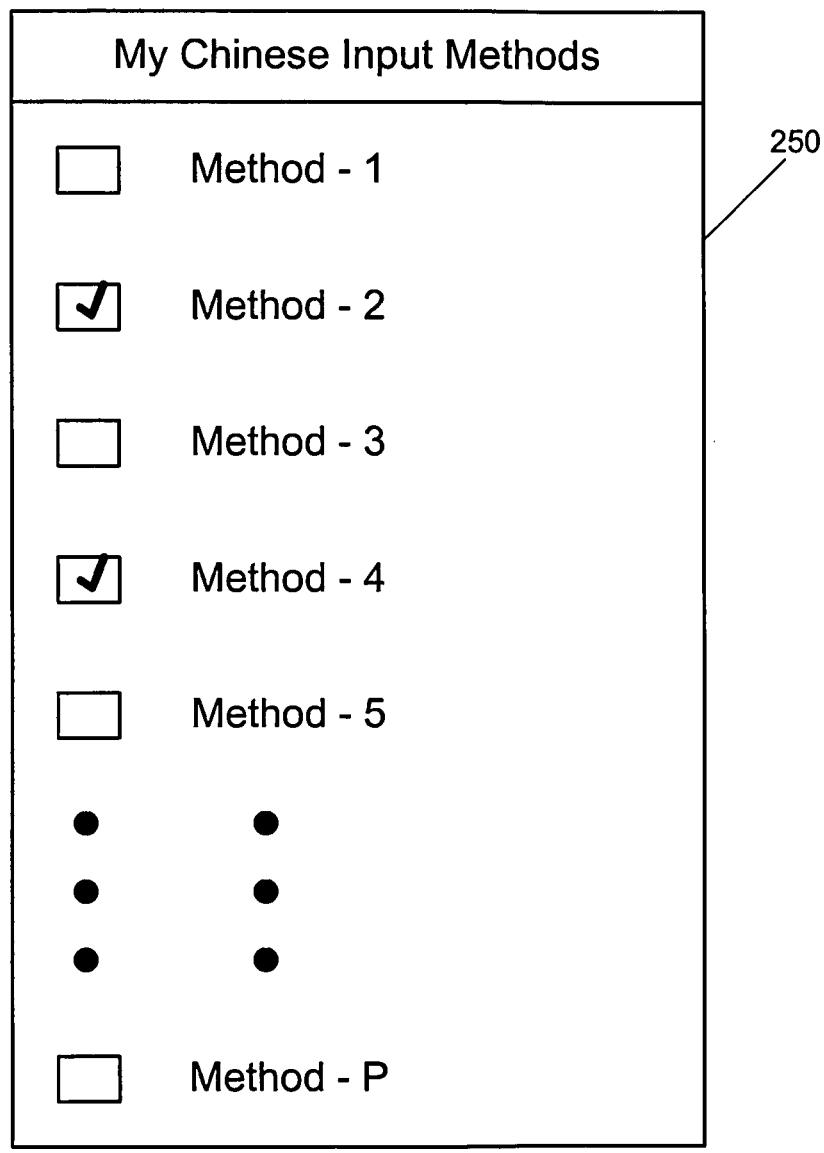
FIG. 2J shows a list of Chinese input methods for a user to select to include in the user's personalized combined Chinese input method, in accordance with one embodiment of the present invention.

The combined Chinese input method shown in FIG. 2C-2H has three Chinese input methods pre-selected by the search system. Alternatively, the search site can allow users to select users' favorite input methods. FIG. 2I shows that behind input method button 211, there is "My CH IME" button 213, in accordance with one embodiment of the present application. If a user, such as User-A, clicks on button 213, a page 250 with a list of Chinese input methods are shown to User-A to select Chinese input methods to be included in the combined Chinese input method. User-A can choose a number of methods that he/she frequently uses.

Figure 3A:
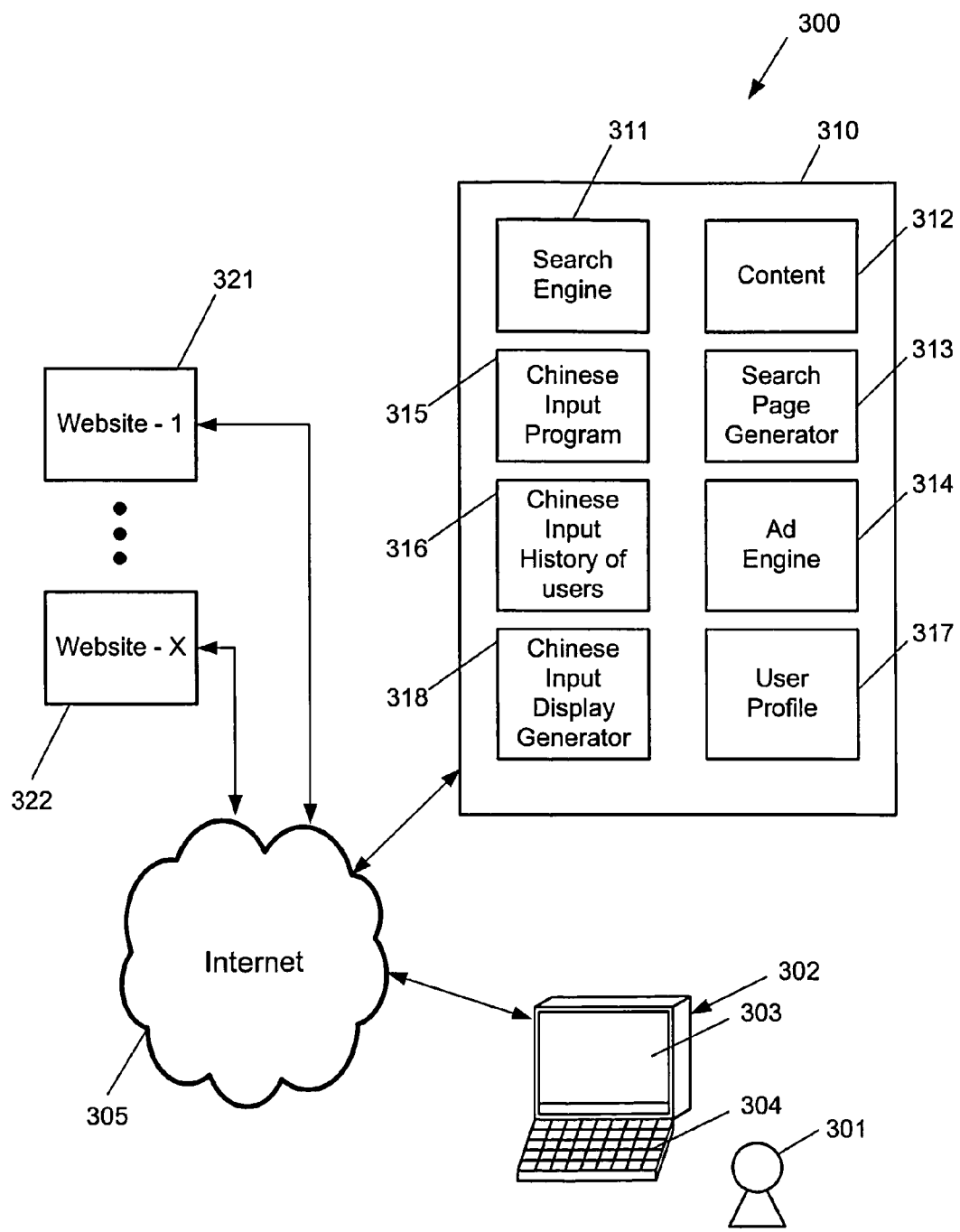
FIG. 3A shows a system for allowing users to enter Chinese characters in a search box, in accordance with one embodiment of the present invention.

FIG. 3A shows a system 300 for allowing users to enter Chinese characters in a search box without specifying a Chinese input method first and without switching between Chinese input methods, in accordance with one embodiment of the present invention. In system 300, there is a User-1 301 interacting with a computing device 302. The computing device 302 has a screen 303 and a keyboard 304. For example, the computing device 302 can be a computer, a personal digital assistant (PDA), a cell phone, or other computing device. The computing device 302 can be any type of computing device with a screen for displaying web content and a keyboard (physical or touch screen) for User-1 301 to enter (or type) alphanumeric symbols. User-1 301 interacts with computing device 302 to access a search system 310. The search system 310 creates search entry pages for users who want to search for information and return search content to users. The search system 310 has a search engine 311, a content storage 312, a search page generator 313, an advertisement engine 314, and a Chinese input program 315. The Chinese input program 315 combines a number of Chinese input methods to allow users to type in Chinese characters in the search box without specifying a particular Chinese input method (or input method) for forming a particular Chinese character. Computing device 302 accesses the search system 310 via the Internet 305. The search system 310 accesses contents on web sites, such as WebSite-1 321 to WebSite-X 322, connected to the Internet 305. The number X, or the number of web sites accessed by the search system 310, can be any integer.

Figure 3B:
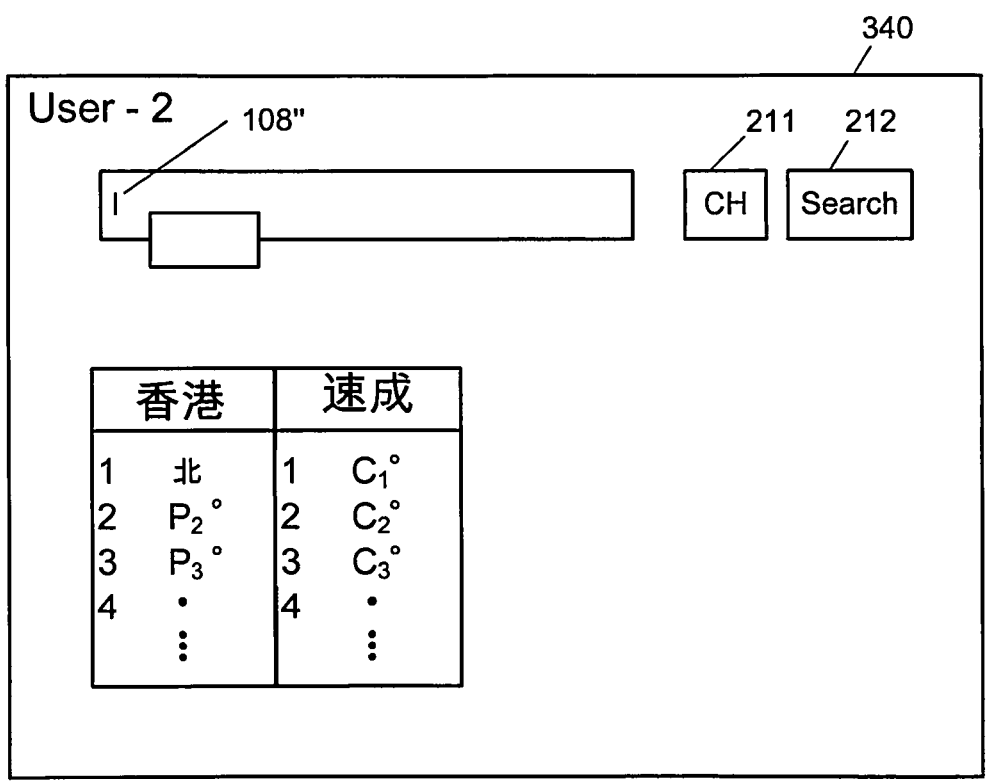
FIG. 3B shows a search page of User-2, in accordance with one embodiment of the present invention.

When User-1 accesses the search site of search system 310, the search site could have known the identity of User-1 to personalize User-1's search experience. For example, when users search Yahoo!™, many of the users are identified by Yahoo!™ by the Yahoo!™ cookies installed on their computing devices. In one embodiment, the combined (or All-In-One) Chinese input method available on the web site is personalized. The search site (or search system 310) can track the Chinese input history of User-1 and knows User-1's preferred input methods. FIG. 3B shows a search page 340 of User-2, in accordance with one embodiment of the present invention. The search site, such as Yahoo!™ Hong Kong, knows the identity of User-2. The search site also knows the preferred input method of User-2 is "Pinyin method," followed by "Canton method." Therefore, when Use-2 enters alphanumeric symbols to generate Chinese characters, the displayed matched words are organized in the order of "Pinyin method" first and followed by "Canton method, as shown in FIG. 3B. Search system 310 can identify User-2's preferred input method either by User-2's Chinese input history stored in Chinese input history of Users 316 by checking Chinese input method(s) selected by User-2, as explained in FIG. 2J. Such personalization allows User-2 to only look for matched Chinese characters under the methods they are most likely to use and would result in faster Character retrieval and better user experience.

Before the search system 310 can identify User-2's preferred Chinese input method(s), the search system 310 can provide default Chinese input methods for User-2 to use until sufficient Chinese input history of User-2 is built or until User-2 identifies preferred input method(s). Once, User-2's Chinese input history is sufficiently established or User-2 has identified preferred input method(s), the system 310 can show the top few Chinese input methods that are most frequently used by User-2 or the preferred input method(s) selected by User-2. In this manner, different number of Chinese input methods can be shown to different users. Such personalization could help users have better Chinese input experience and enable faster character retrieval.

To enable personalized Chinese input, the search system 310 has a module of User Profile 317, which allows search system 310 to identify users, such as User-2, as shown in FIG. 3A. The User Profile module 317 stores the identification of users and also information about users, such as their age, gender, geographical location, income level, and past search key words, etc. User profile information helps search sites to match advertisements to be displayed with search results. The advertisements are targeted to different types of users, which can be identified by user profiles. User profile information also helps search sites to provide contents relevant to users. In addition to User Profile module 317, search system 310 also includes the storage for Chinese input history of users 316, which stores information including Chinese characters entered by users and the associated Chinese input methods used by users. In one embodiment, the information stored in the Chinese input history of users 316 can be used to place characters (words) that users have input frequently before to the top of the list of matched characters. In one embodiment, system 310 also includes a Chinese input display generator 318 that works with the Chinese input program 315, the Chinese input history of users 316 to generate displays of matched Chinese characters shown in Figures above, such as FIGS. 2C-2G.

As mentioned above in FIG. 3B, search system 310 knows User-2's preferred method(s) of inputs. In addition, the data in storage 316 of FIG. 3A indicates that User-2 has entered the Chinese character "bei3 (北)" many times. Therefore, when Use-2 enters the alphanumeric symbols "bei2" for Chinese character "north (北)", the search system can present the "north (北)" at the top of the list when User-2 only enters "b" or "be". FIG. 3B shows that when User-2 enters "be", the search system 310 analyzed data in storage 316 and learned that the most often entered Chinese characters by User-2 that starts with "be" is "north (北)." Search system 310 places "north (北)" at top of "Pinyin method". Since the character "north (北)" (under number 1 of Pinyin method) is the character User-2 wants to enter, User-2 can easily select the character. User-2 did not have to type in the full "bei3" to find the Chinese character "north (北)." Alternatively, search system 310 can analyze the Chinese character entering history of User-2 and can find that the most recent Chinese character entered by User-2 that starts with "be" is "north (北)." The system can place this most recently entered Chinese character that matches with "be" entered by User-2 on top of the list. Users often enter related search keywords during search to find information related to a subject or to refine search. Different algorithms can be used by the search system 310 to determine the ordering of matched characters.

Such personalized Chinese input method will improve user experience and make the Chinese input easier and faster for users. One thing to note is that there could be more than one Chinese character that matches a particular string of alphanumeric symbols in Chinese language for a phonetic method, such as Pinyin method. If there is more than one Chinese character that matches the string of alphanumeric symbols used to generate the Chinese character, users can select one from the few that matches the symbols. Alternatively, the system can auto-select one for users. Users can decide whether the auto-selected ones are the correct ones or not.

Figure 4A:
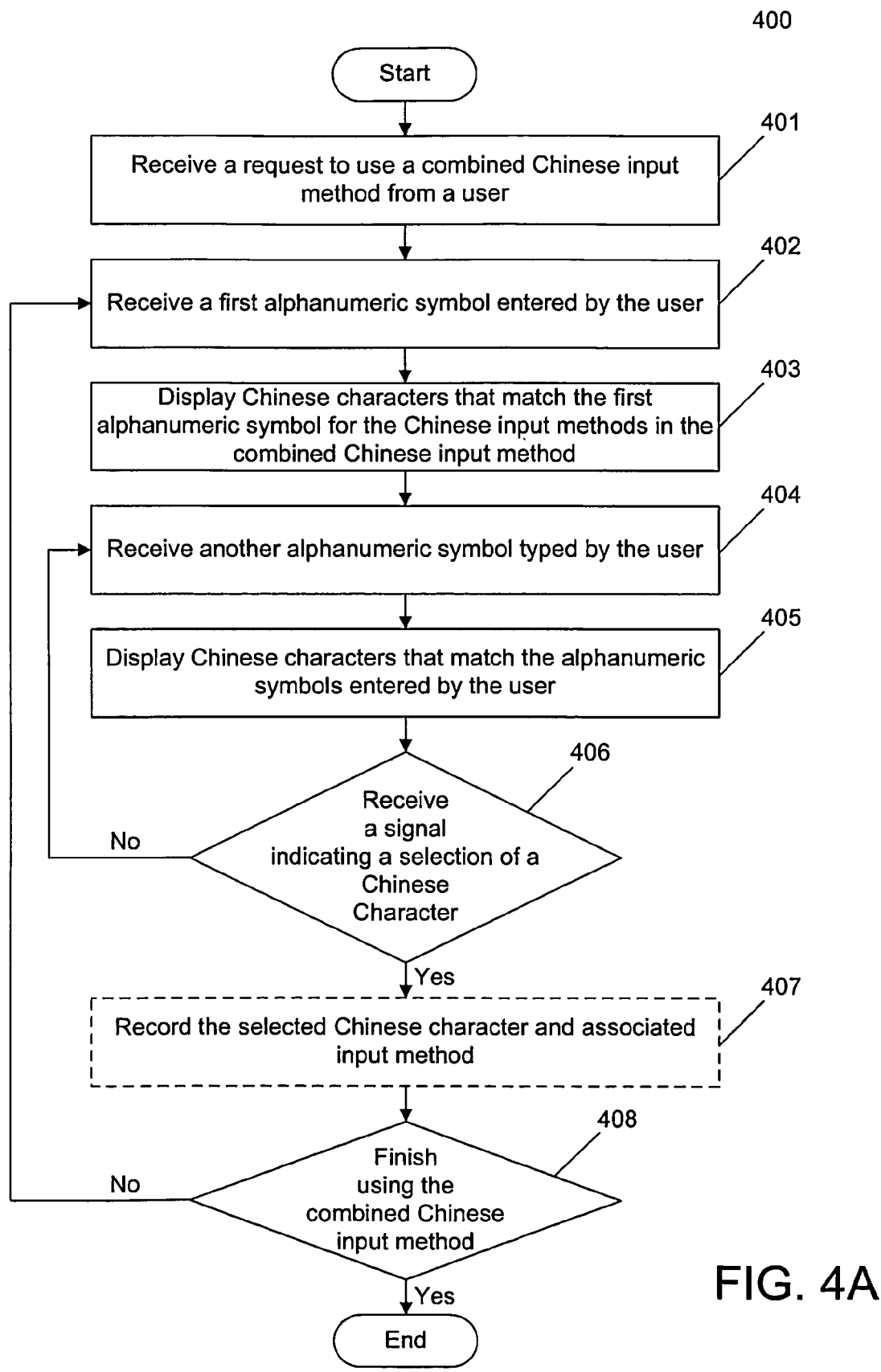
FIG. 4A shows a process flow of Chinese input in a search box of a search site, in accordance with one embodiment of the present invention.

FIG. 4A shows a process flow 400 of Chinese input (or character-entering) in a search box of a search site, in accordance with one embodiment of the present invention. At operation 401, a user chooses to enter Chinese character(s) by clicking on an input language selection button. The user's choice is sensed by the search site by a signal, such as an electrical signal triggered by pushing a key on a computing device. As described above, the input language button allows users to select input language. For example, the language choices can include English and Chinese. Alternatively, the language choices can be more than two languages. Three or more types of languages can be included. If Chinese language is selected, a combined (or All-In-One) Chinese input method will be used.

At operation 402, the user types in a first alphanumeric symbol, which is part of a string of alphanumeric symbols used to form a Chinese character based on a particular Chinese input method, which one of the methods included in the combined Chinese input method. The search site receives a signal indicating the first alphanumeric symbol typed by the user. Based on the typed alphanumeric symbol, the system filters out the Chinese characters that do not start with the typed alphanumeric symbol. At operation 403, the system displays Chinese characters that match the first alphanumeric symbol for Chinese input methods included in the combined Chinese input method. The number and types of Chinese input methods can be determined by the web site for all users or can be personalized for individual users. At operation 404, the user types in another alphanumeric symbol. At operation 405, the system displays Chinese characters matched with the symbols entered for different input methods to the user. If the user finds a matched Chinese character, the user can click on the character to select it. At operation 406, the system determines whether the user has entered a signal indicating a selection of one of the displayed characters or not. If the answer is "yes" (i.e. the user has selected a Chinese character from one of the input methods), the process flow 400 proceeds to next operation 408. Otherwise, the process flow returns to operation 404, where the user enters another alphanumeric symbol to refine the matching of characters. In one embodiment, operations 404 and 405 can be skipped, if the user finds a matched Chinese character after the user only entered the first English alphabet.

Optionally, between operation 406 and 408, there is an operation 407, where the character and input method selected by the user is recorded by the search system. Such recording would help the search system to offer personalization of Chinese input, as discussed above. At operation 408, the system determines if the user has finish using Chinese input method. If the user has finish using the Chinese input method, the user can push a search button, such as search button 212 of FIGS. 2C-2I, and 3B, on the search page to start the search. Alternatively, the user can switch to enter English word(s) in the search box. In addition, the user can skip the search altogether and decides to visit another web page or web site. If the answer to operation 408 is "yes", the usage of Chinese input method is completed and the flow process comes to an end. Otherwise, the process flow returns to operation 402 to enter another Chinese character. The user can enter a string of alphanumeric symbols to input another Chinese character. As discussed above, users can enter a string of Chinese characters (or words) or a string of words mixed in Chinese and English in the search box.

As described above, the displayed Chinese characters that match the string of alphanumeric symbols typed by the user can be displayed in the order based on the user's Chinese input history. The combined Chinese input method can include two, three, four or more Chinese input methods. The matched Chinese characters are displayed under the available input methods in the order of from the most favorite input method to the least favorite input method.

As mentioned above, such combined Chinese input method can be used for entering Chinese characters in a document (such as a Microsoft WORD™ document) or a form on a user's computer, or a form (or input box) on a web site, such as a search box or an entry form. A process flow similar to process flow 400 can be used to describe the operations involved in entering Chinese characters in forms. If the document resides on the user's computer, the program for the combined Chinese input method can reside on the user's computer. In one embodiment, the user's computer also records the history of the user's character selection and the Chinese input methods for the selected characters to personalize the user's Chinese input on the user's computer. In the example discussed above, the symbols entered by the user are alphanumeric. Alternatively, the symbols entered by the users do not need to be alphanumeric. Users may press the alphanumeric keys on the keyboard, but the characters appear on the screen that correspond to the alphanumeric string could be other types of symbols.

Figure 4B:
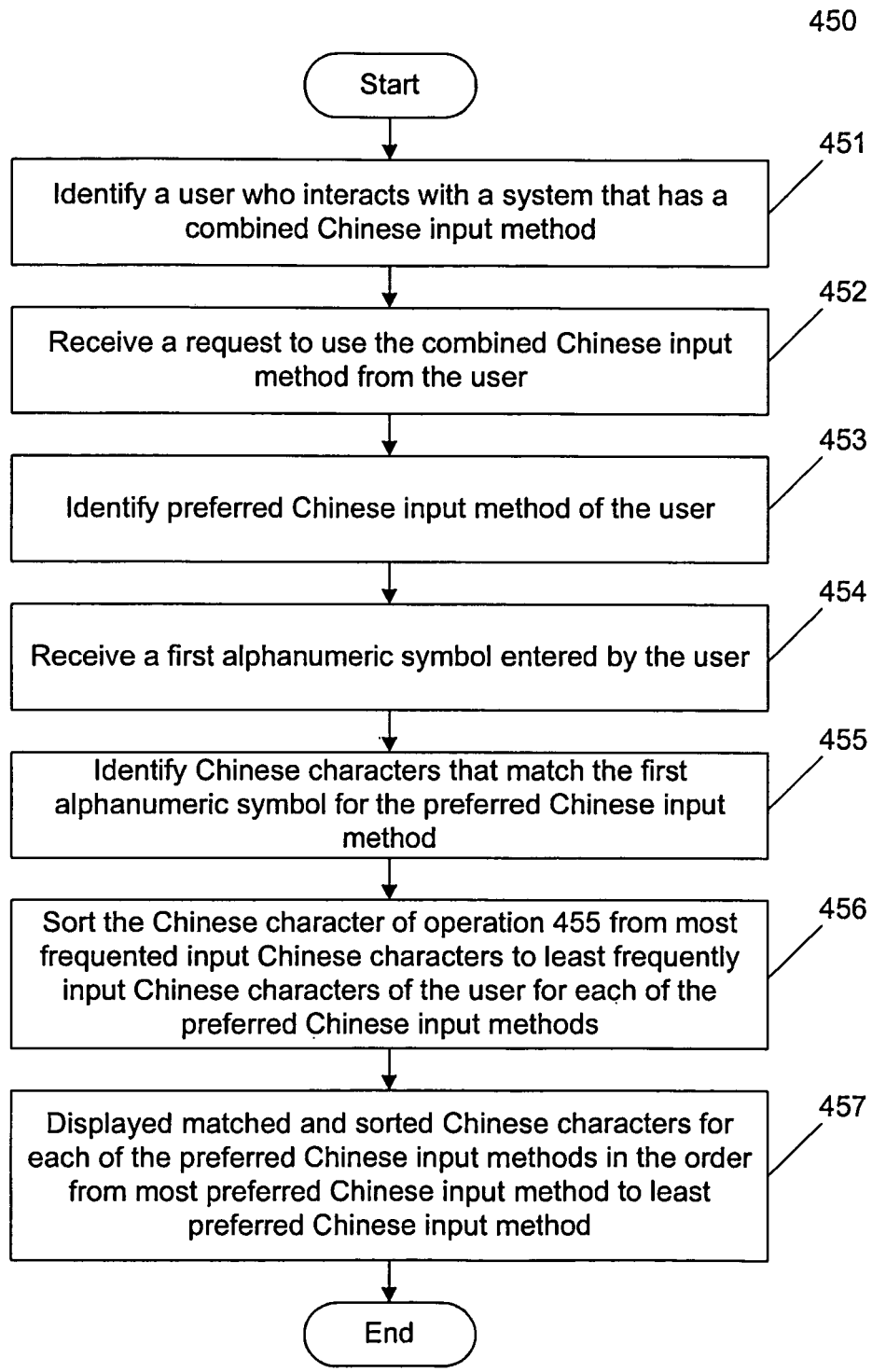
FIG. 4B shows a process flow of using a personalized combined Chinese input method by a user, in accordance with one embodiment of the present application.

FIG. 4B shows a process flow 450 of using a personalized combined Chinese input method by a user, in accordance with one embodiment of the present application. At an optional operation 451, a web site identifies a user. This operation is only needed if the user is interacting a web site to enter a search box or a form. If the use is working on a document on the user's computer, this operation is not needed. At operation 452, the user selects Chinese as input language. In one embodiment, the user clicks on a language selection button on the computer screen. The button can also be on a web site, if the user is entering a web form. The Chinese input method is a combined method that includes more than one Chinese input method. If the user is entering Chinese character(s) on a form of the web site, an optional operation 453 occurs. At operation 453, preferred Chinese input methods are identified by analyzing the Chinese input history of the user. The Chinese input history of the user can be stored on the user's computer, if the user is working on a document. Alternatively, the Chinese input history of the user can be stored on the web site, if the user is entering Chinese characters in a search box or in a form on a web site. If the user has never used the combined Chinese input method or has not used the method often or long enough, a default combined Chinese input method that includes a number of Chinese input methods, can be selected by the system. Alternatively, the system can allow the user to specify preferred input methods and stores such information in the system. At operation 454, the user types in the a first alphanumeric symbol, which belongs to a string of alphanumeric symbols used to identify a Chinese characters by one of Chinese input methods included in the combined Chinese input method. The user's input is received by the user's computer or the system of the web site. At operation 455, the system identifies the Chinese characters that match with the first alphanumeric symbol entered by the user for each of the Chinese input methods identified in operation 453. At operation 456, the computer system sorts the matched Chinese characters for each of the selected Chinese input methods to place the most frequently or recently input Chinese character on top of each method and least frequently input Chinese character on bottom of each method. In one embodiment, the sorting of the matched Chinese characters is based on the user's Chinese input history. The user more frequently enters some Chinese characters than other characters. Most users have a list of Chinese characters that they are familiar with and often use them repeatedly. This embodiment works better when there is sufficient history of Chinese input of the user. In another embodiment, the sorting is based on a database that stores most frequently input Chinese characters by many users. The database can reside on the user's computer if the user is entering Chinese characters in a document, a spreadsheet, or a form, etc. on the user's personal computer. The database could be downloaded onto the user's computer when the user installs the software for the combined Chinese input method or being part of the software. Alternatively, the database could reside on a web site, which the user is entering characters. The web site can collect Chinese character input history of many users, such as all users, that use Chinese input methods to enter Chinese characters.

At operation 457, the computing system displays the matched Chinese characters for each input method with the method most preferred by the user being first, followed by less preferred method(s). Further, the most frequently or recently input Chinese characters are displayed at the top of the list, followed by the less input Chinese characters, for each method. The process flow can continue to allow the user to enter additional symbols of the string of alphanumeric symbols for forming the Chinese character. Further the process slow can continue to allow the user to enter other string of alphanumeric symbols to input additional Chinese characters.

The software program for the combined Chinese input method described above that combines a few Chinese input methods into one display and also has the personalized capability can be stored on the search site (or server of the search site) or on users' computing devices. Storing such software program on the web sites is particular beneficial for users of mobile devices, such as cell phones. Mobile devices typically have limited storage can computing capacities. The software program of the combined Chinese input method can take up significant storage space and processing resources. For mobile device users, it would be very desirable for the software program and user information to be stored on web sites, instead of the mobile devices.

The combined Chinese input method and personalization of Chinese input can apply to entering forms on web sites. They can also be applied to Chinese input in documents and forms, such as Microsoft WORD™, Excel™, or other types of software for Chinese input.

The systems and methods described above for personalized combined Chinese input method that allows users not to identify input method when entering Chinese characters. The systems and methods enable fast character retrieval and enhance user experience. They can be applied to other languages that have more than one input method. Other languages can also benefit from a combined input method that relieves users from tedious switching. Further, the personalization of input method can also improve user experience for users who want to enter characters of other languages.

Embodiments of the present invention describe systems and methods for using a combined (or All-In-One) Chinese input method to enter Chinese characters in documents and forms on computers or on web sites. The combined Chinese input method includes a number of Chinese input methods that are frequently used by users. Chinese characters that match the strings of symbols typed by users are automatically generated and displayed under each of the Chinese input methods for users to select the correct characters under the desired Chinese input methods. The combined Chinese input method allows users to enter (or input) Chinese characters without specifying the Chinese input methods being used, which reduces the time used in switching input methods. Further, the combined Chinese input method can also be personalized to include Chinese input methods frequently used or specified by users. The display of the Chinese characters matching the strings of symbols entered to form Chinese characters can also be personalized to enhance usability and to increase the speed of identifying matched Chinese characters.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter read by a computer system. The computer readable medium may also include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. An electronic device implementing a method for Chinese input, the electronic device having a display for rendering a webpage, the webpage including an input field, the method comprising:
   receiving a request to use a combined Chinese input method from a user via the webpage, wherein the combined Chinese input method includes a plurality of Chinese input methods;
   receiving a first string of symbols typed in sequentially by the user in the input field, wherein the first string of symbols is used to input a first Chinese character;
   displaying a graphical table of options for the first Chinese characters, wherein each option is identified in a column of the graphical table which presents Chinese characters that match the first string of symbols based on each of the plurality of Chinese input methods included in the combined Chinese input method; and
   receiving data indicating a selection of one of the displayed Chinese characters as the first Chinese character;
   wherein the combined Chinese input method displays the graphical table automatically in location that is next to the input field, and the options of Chinese characters for each Chinese input method are displayed without first specifying any one of the plurality of Chinese input methods, the first Chinese character being selectable from any one of the columns corresponding to a respective one of the plurality of Chinese input methods.

2. The electronic device implementing the method of claim 1, wherein Chinese characters that do not match the first string of symbols typed in sequentially by the user are filtered out.

3. The electronic device implementing the method of claim 1, wherein the first string of symbols is a part of a whole first string of symbols to form the Chinese character by one of the plurality of Chinese input methods.

4. The electronic device implementing the method of claim 1, further comprising receiving a second string of symbols typed in sequentially by the user, wherein the first string of symbols is used to input a second Chinese character;

displaying Chinese characters that match the second string of symbols for the plurality of Chinese input methods;

receiving another signal indicating another selection of one of the displayed Chinese characters as the second Chinese character.

5. The electronic device implementing the method of claim 1, wherein the plurality of Chinese input methods are selected from a list including Pinyin, Zhuyin, Canton, Cangjie, Simplified, CKC, Boshiamy, Dayi, Array, Four corner, Q9, Tzeloi, and Renzhi code methods.

6. The electronic device implementing the method of claim 1, wherein the symbols are alphanumeric.

7. The electronic device implementing the method of claim 1, further comprising:
identifying a history of input for the user that identifies preferred ones of the plurality of Chinese input methods, wherein the graphical table includes a set of columns that do not include columns for all of the plurality of Chinese input methods;
wherein the columns of the graphical table that are displayed are selected based on the preferred ones of the user, as determined from the history of input for the user.

8. The electronic device implementing the method of claim 6, wherein the Chinese characters that match the first string of alphanumeric symbols for the plurality of Chinese input methods are displayed in an order of a Chinese input method most frequently used by the user being displayed at a first position and a Chinese input method least frequently used by the user being displayed at a last position.

9. The electronic device implementing the method of claim 8, wherein the matched Chinese characters are displayed in an order of Chinese characters that are most frequently or recently input by the user being displayed on top of a list and Chinese characters that are least frequently or recently input by the user at bottom of a list under each of the plurality of Chinese input methods.

10. The electronic device implementing the method of claim 1, further comprising:
recording the selection of the one of the displayed Chinese characters.

11. The electronic device implementing the method of claim 10, wherein the recording includes the selected first Chinese character and a Chinese input method associated with the selected first Chinese character.

12. The electronic device implemented method of claim 1, wherein the combined Chinese input method allows the user to input Chinese characters without specifying Chinese input method.

13. An electronic device implementing a method for personalized Chinese input, comprising:
receiving a request to use a combined Chinese input method from a user via a webpage including an input field, wherein the combined Chinese input method includes a plurality of Chinese input methods;
identifying the user and Chinese input history of the user after receiving a request to use a combined Chinese input method from the user;
identifying a plurality of Chinese input methods that had been used by the user and an order of the plurality of Chinese input methods from a most frequently used method to a least frequently used method based on the Chinese input history of the user, wherein the plurality of the Chinese input methods are part of the combined Chinese input method;

receiving a first string of symbols entered by the user at the input field, wherein the first string of symbols is used to input a first Chinese character;
identifying Chinese characters that match the first string of symbols entered by the user for each of the plurality of Chinese input methods;
sorting the identified Chinese characters in the order from most frequently or recently entered characters to least frequently or recently entered characters for each of the plurality of Chinese input methods;
displaying a graphical table of options for the first Chinese characters in response to the received first string of symbols, wherein each option identified in a column of the graphical table which presents Chinese characters that match the first string of symbols entered by the user based on each of the plurality of Chinese input methods included in the combined Chinese input method, wherein the sorted and matched Chinese characters are displayed under each of the plurality of Chinese input methods, and wherein the plurality of Chinese input methods are displayed from the most frequently used method to the least frequently used method;
receiving data indicating a selection of one of the displayed Chinese characters as the first Chinese character; and
displaying the selected first Chinese character on a display screen;
wherein the combined Chinese input method displays the graphical table automatically in location that is next to the input field, and the options of Chinese characters for each Chinese input method are displayed without first specifying any one of the plurality of Chinese input methods, the first Chinese character being selectable from any one of the columns corresponding to a respective one of the plurality of Chinese input methods.

14. The electronic device implementing the method of claim 13, further comprising
receiving a second string of symbols typed in sequentially by the user, wherein the second string of symbols is used to input a second Chinese character;
identifying Chinese characters that match the second string of symbols entered by the user for each of the plurality of Chinese input methods;
sorting the identified Chinese characters that match the second string of symbols in the order from most frequently entered characters to least frequently entered characters for each of the plurality of Chinese input methods;
displaying the Chinese characters that match the second string of symbols entered by the user for the plurality of Chinese input methods included, wherein the sorted and matched Chinese characters are displayed under each of the plurality of Chinese input methods, and wherein the plurality of Chinese input methods are displayed from the most frequently used method to the least frequently used method; and
receiving another signal indicating another selection of one of the displayed Chinese characters as the second Chinese character.

15. The electronic device implementing the method of claim 13, further comprising:
entering an English word after the first Chinese character, wherein before entering the English word the combined Chinese input method needs to be switched to an English input method.

16. The electronic device implementing the method of claim 13, wherein the personalized Chinese input can be performed when the user is entering a document or a form on a personal computing system or on a web site.

17. A method for Chinese input to a display screen rendered by an computer program, the computer program having instructions for causing an input field to be rendered on the display screen, the method comprising:

provinding data for rendering an input field, the input field configured to receive alphanumeric characters that are non-Chinese characters;

providing data for rendering a table that includes a plurality of columns, each column of the table is associated with one of a plurality of Chinese input methods;

receiving one or more of the alphanumeric character in the input field, the alphanumeric characters being processed to produce options of Chinese characters in each of the columns of the table, wherein the options of Chinese characters in each of the columns of the table narrow down options of Chinese characters for the received alphanumeric characters; and receiving selection of one of the Chinese characters, the selection being from one of the columns that correspond to one of the plurality of Chinese input methods, the selection of the Chinese character acting to place the selected Chinese character in a search box field; enabling wherein additional alphanumeric characters are received in the input field and additional selections of Chinese characters from the columns of the table enable selection of the Chinese character from particular ones of the plurality of Chinese input methods, the additional selections of Chinese characters being added to the search box field, wherein Chinese characters added to the search box field include Chinese characters selected from at least two columns of the table that correspond to at least two different ones of the plurality Chinese input methods;

wherein the each Chinese input methods are displayed in the table without first specifying any one of the plurality of Chinese input methods, the method being executed by a processor.

\* \* \* \* \*